United States Patent [19]

Drouet

[11] Patent Number: 5,046,145

[45] Date of Patent: Sep. 3, 1991

[54] IMPROVED ARC REACTOR WITH ADVANCEABLE ELECTRODE

[75] Inventor: Michel G. Drouet, St-Bruno, Canada

[73] Assignee: Hydro-Quebec, Montreal, Canada

[21] Appl. No.: 512,166

[22] Filed: Apr. 20, 1990

[51] Int. Cl.[5] .................... B23K 9/00

[52] U.S. Cl. .................... 219/121.36; 219/121.51; 219/121.53; 373/81; 373/88; 373/18; 373/63

[58] Field of Search .................... 219/121.36, 121.48, 219/121.51, 121.52, 75, 121.4, 121.43, 121.53, 383; 313/231.31, 231.41; 427/34; 373/18-22, 63, 81, 88

[56] References Cited

U.S. PATENT DOCUMENTS

| | | | |
|---|---|---|---|
| 3,541,625 | 11/1970 | Burggraaf | 373/22 |
| 3,944,412 | 3/1976 | Liu | 219/121.36 |
| 4,289,949 | 9/1981 | Raaness et al. | 219/121.36 |
| 4,361,441 | 11/1982 | Tylko | 373/22 |
| 4,466,824 | 8/1984 | Gauvin et al. | 373/22 |
| 4,818,837 | 4/1989 | Pfender | 219/121.36 |
| 4,864,096 | 9/1989 | Wolf et al. | 219/121.36 |

*Primary Examiner*—M. H. Paschall
*Attorney, Agent, or Firm*—Foley & Lardner

[57] ABSTRACT

There is disclosed an arc reactor for treating a material in powder form conductive at very high temperatures, the reactor comprising a vertical electrically insulated sleeve cylindrical in shape, an upper electrode coaxially mounted with the sleeve at its upper end, a bottom electrode cooperating with the upper electrode, injectors for injecting a gas tangentially into the sleeve in order to create a vortex inside the same, a feed mechanism for introducing the powder material inside the sleeve near its upper end, so as to form a uniform cylindrical curtain of particles falling down into the sleeve, the particles being centrifugally projected against the internal wall of the sleeve by the vortex and entirely covering the internal wall while they are being simultaneously treated by the arc column, a crucible positioned under the sleeve to collect the treated particles in molten form that drip down from the sleeve, the molten material in use being in conductive contact with the bottom electrode, and a drive system to adjust a vertical position of the upper electrode, the upper electrode being slideable through the upper end and being made of a consumable electrode material. The upper electrode does not require water cooling and lasts for longer operation.

10 Claims, 2 Drawing Sheets

IMPROVED ARC REACTOR WITH ADVANCEABLE ELECTRODE

BACKGROUND OF THE INVENTION

1. Field of the Invention

The present invention relates to an improved arc reactor having an advanceable electrode for use in treating ores or other metallic or non-metallic compounds at very high temperatures in order to physically or chemically transform the same.

2. Description of the Prior Art

Arc reactors are well-known devices that have been made the subject of much research and development over the last decades. By definition, such reactors make use of a heat generating arc column between a set of electrodes to heat the ores or compounds to be treated at very high temperatures and thus allow reactions to occur that would otherwise not be obtainable. The arc column consists of a mixture energized and/or dissociated molecules, positively charged ions and free electrons obtained from a gas (hereinafter called "plasma gas") subjected to partial ionization by means of an electric arc (usually direct current) formed between an anode and a cathode.

More specifically, the electric arc reactor which is improved by the present invention is of the type having an upper electrode located in an upper sleeve chamber, and a lower electrode in conductive contact with the conductive molten ore placed in a crucible below the upper electrode. The arc column formed between the upper and lower electrodes melts the ore introduced in the sleeve chamber and causing the desired physical or chemical transformation, and the molten ore then falls into the crucible. Such reactors are described in U.S. copending application 399,997 filed Aug. 29, 1989, pending, which is incorporated herein by reference.

Arc reactors using "non-consumable" electrodes are currently used. However the lifetime of the so-called non-consumable electrodes varies between 3 and 1,000 hours depending on the operating conditions. Electrode replacement is expensive and often the reactor process has to be stopped.

Non-consumable electrodes in general, have to be water cooled otherwise the erosion will be too extensive. Water leaks in the reactor have happened in several cases and explosions have occurred because of the reaction of the water with the material being treated at high temperature.

SUMMARY OF THE INVENTION

An object of the present invention is to provide an arc reactor which uses a consumable electrode which can be advanced as the electrode is consumed to provide long term continuous operation.

Another object of the present invention is to provide an arc reactor with a consumable electrode which does not require water cooling.

Preferably, the consumable electrode is made of graphite. The reactor in which the invention may be utilized comprises a vertical, electrically insulated sleeve provided at its upper end with the graphite electrode of a conventional structure, for use to sustain an arc between its lower end and a melt contained in the reactor crucible. The electrode is lowered to be closer to the melt so that an easy start up of the arc is possible. Once the arc is started, the electrode is raised back into the sleeve chamber. The material to be treated is introduced, in powder form, inside at the top of the sleeve beside the electrode. The material is centrifugally projected against the internal wall of the sleeve by a tangential gas flow injected inside the sleeve so as to form a substantially uniform cylindrical curtain of particles falling down the sleeve. These particles entirely cover the internal wall of the sleeve and shield the same while they are being simultaneously treated by the heat generated by the arc column The reactor further comprises a crucible positioned under the sleeve to collect the treated particles in molten form that drip down from the sleeve at the lower end thereof. A second electrode is provided at the bottom of the crucible to complete the electrical circuit formed by the graphite electrode, the arc, the conducting melt and the external cables connected to the electrical power supply.

The consumable electrode, preferably made graphite, has been proven to be highly reliable in arc furnaces in many different applications at power levels up to 50 megawatts, although not in the configuration according to the present invention.

In accordance with the invention, these and other objects are achieved with an arc reactor for use to treat a material in powder form conductive at very high temperatures, which reactor comprises:

a vertical electrically insulated sleeve having an upper end, a lower end and an internal wall cylindrical in shape;

an upper electrode coaxially mounted with the sleeve at the upper end;

a bottom electrode cooperating with the upper electrode by proper connection of both of the electrodes to an electric power source, able to provide between the upper and bottom electrodes an arc column;

means for injecting a gas tangentially into the sleeve in order to create a vortex inside the same;

means for introducing the powder material to be treated inside the sleeve near the upper end thereof beside the upper electrode, so as to form a substantially uniform cylindrical curtain of particles falling down into the sleeve, the particles being centrifugally projected against the internal wall of the sleeve by the vortex and entirely covering the internal wall to shield the same while they are being simultaneously treated by the arc column;

a crucible positioned under the sleeve to collect the treated particles in molten form that drip down from the sleeve at the lower end thereof, the molten material in use being in conductive contact with the bottom electrode and the molten material, and positioning means to adjust a vertical position of the upper electrode, the upper electrode being slideable through the upper end of the sleeve and being made of a consumable electrode material.

The electrode according to the invention may also comprise a bore so that temporary or continuous gas feed into the arc column of a gas, such as argon, is possible to facilitate starting the arc or even to allow a more stable operation of the arc.

BRIEF DESCRIPTION OF THE DRAWINGS

The invention will be better understood upon reading the following description of a preferred embodiment thereof, given in connection with the accompanying drawings in which.

DESCRIPTION OF THE PREFERRED EMBODIMENT

Figure 1:
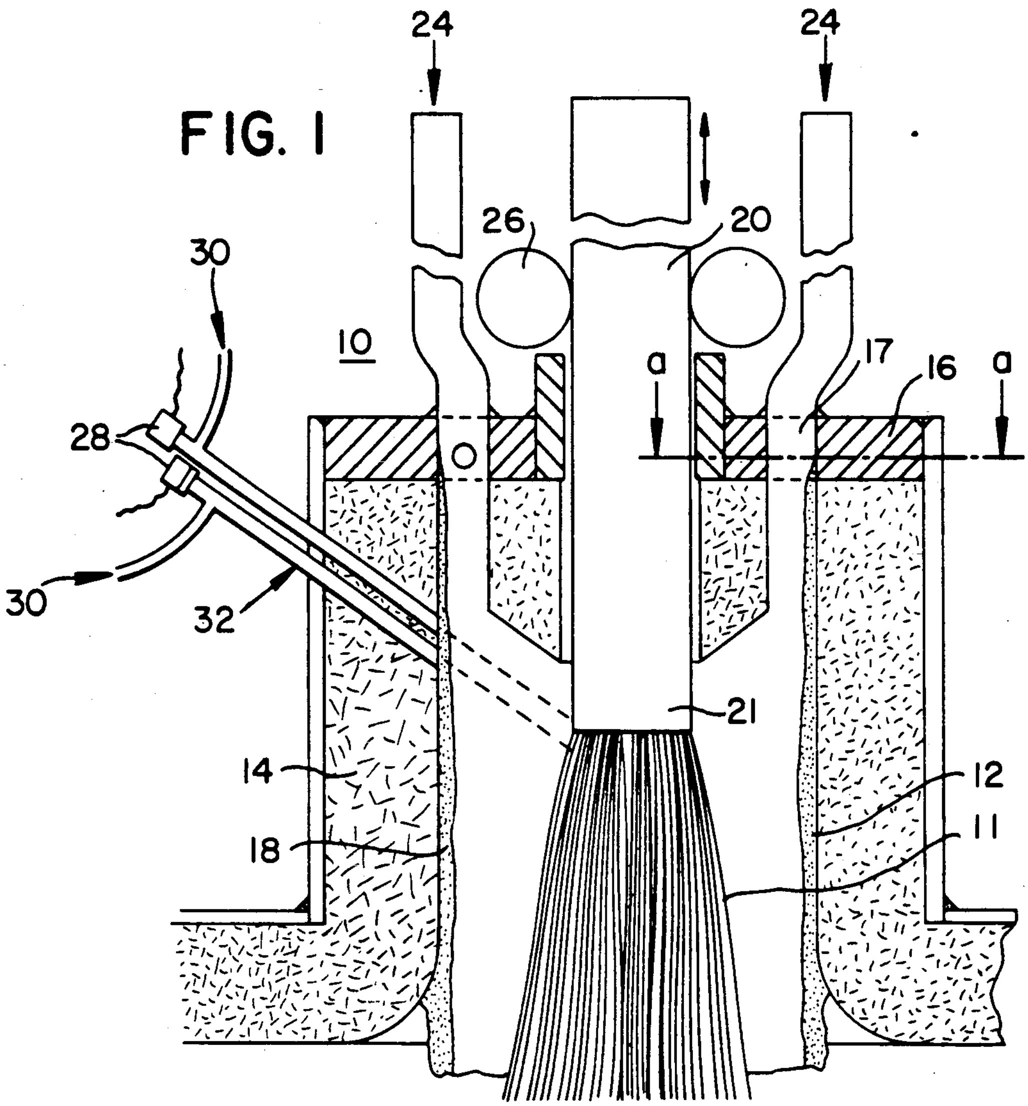
FIG. 1 is a diagrammatic vertical section of an arc reactor sleeve and upper electrode assembly according to the invention.

FIG. 1 shows the upper electrode and feed assembly of arc reactor 10. Upper electrode 20 is vertically displaceable for vertical position adjustment Upper electrode 20 is a graphite electrode of conventional solid construction. The material 12 to be treated enters through feed tubes 24 at the internal periphery of sleeve 14. Light pipes 32 are aligned with the end 21 of electrode 20. The presence or absence of light emitted from the end 21 travels down light pipes 32 and reaches sensors 28. A gas feed 30 is continuously fed to light pipes 32 in order to keep the ends of light pipes 32 at the cylindrical wall 18 free from blockage by material 12. An alarm (not shown) is connected to the gas feed 30 and is triggered when the gas flow drops below a given control value. Light filters may be coupled with sensors 28 to filter or reduce the intense light of arc 11.

Figure 2:
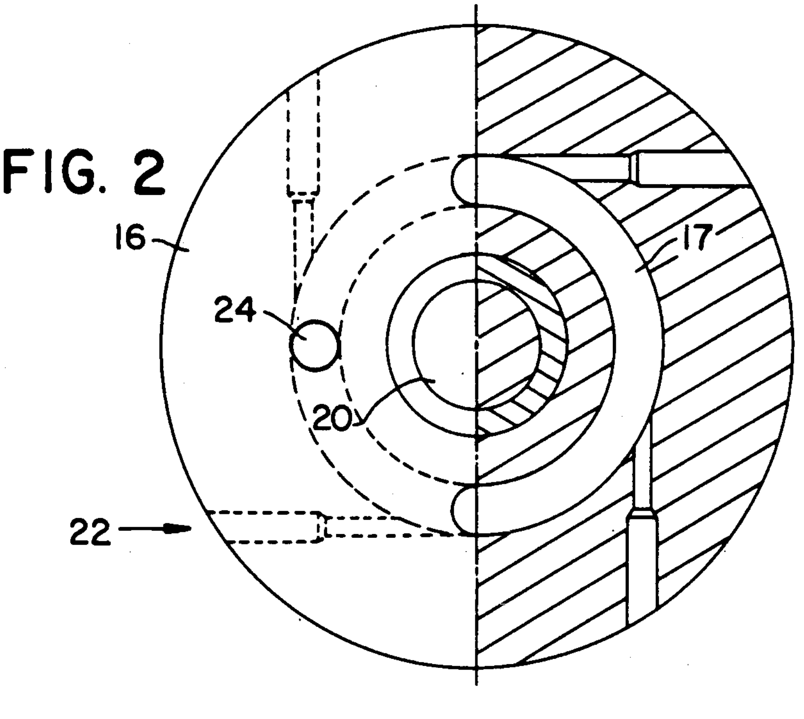
FIG. 2 is a horizontal section about line AA of FIG. 1.

With reference to FIG. 2, there is shown in the upper end plates 16 of sleeve 14 a circular channel 17 into which jets of gas are injected by gas feed 22. The upper end 16 is made of an abrasion resistant steel and the channel 17 is formed therein. The gas feed 22 is ejected tangentially into the annular channel at four equally spaced points. The propulsion gas injected entrains the material 12 in a rotating motion and the material 12 is centrifugally accelerated against the cylindrical wall 18. Material 12 is introduced in the upper part of the sleeve chamber by dropping material 12 at four equal spaced points (two of which are shown in FIG. 1). The material 12 forms a film on the cylindrical wall 18 as shown in FIG. 1 and this film is heated by the radiation of arc 11.

With reference to FIG. 1, arc 11 is formed between upper electrode 20 and molten material 12 located in a crucible (not shown) below sleeve 14. A bottom electrode is arranged in operation to be in electrical contact with molten material 12 and an arc power supply (not shown) to provide a circuit between electrode 20 and molten material 12 in the crucible. The material 12 in the crucible is also kept hot by the current flowing through it to the bottom electrode. At start up, a drive system 26 is used to lower electrode end 21 to be closer to either the bottom electrode or a preheated molten material 12 in the crucible, and once lowered the arc 11 is started easily. The electrode 20 is then raised to its normal position as shown in FIG. 1.

The position of the end 21 of electrode 20 slideable through the upper end 16 of sleeve 14 must be adjusted to assure an adequate energy transfer to the film of material 12. A preferred embodiment shows two units, each comprising a sensor 28, a gas feed 30 and a light pipe 32, one unit receiving radiation from the arc 11 and the other unit receiving radiation in use from the red hot end 21 of electrode 20. The light pipes 32 extend through the outer wall of sleeve 14 and through the inner cylindrical wall 18 to provide a radiation communication path between sensors 28 and end 21. The light coming to the lower one of the two sensors 28 is attenuated by a high density filter 29. Each light sensor 28 generates a voltage signal V1 and V2 which is proportional to the magnitude of the light incident on the sensor surface.

Each voltage signal is compared to a reference voltage in amplitude by comparators (not shown) whose outputs signals trigger the power supply used to raise or lower the electrode 20 by means of drive system 26.

Figure 3A:
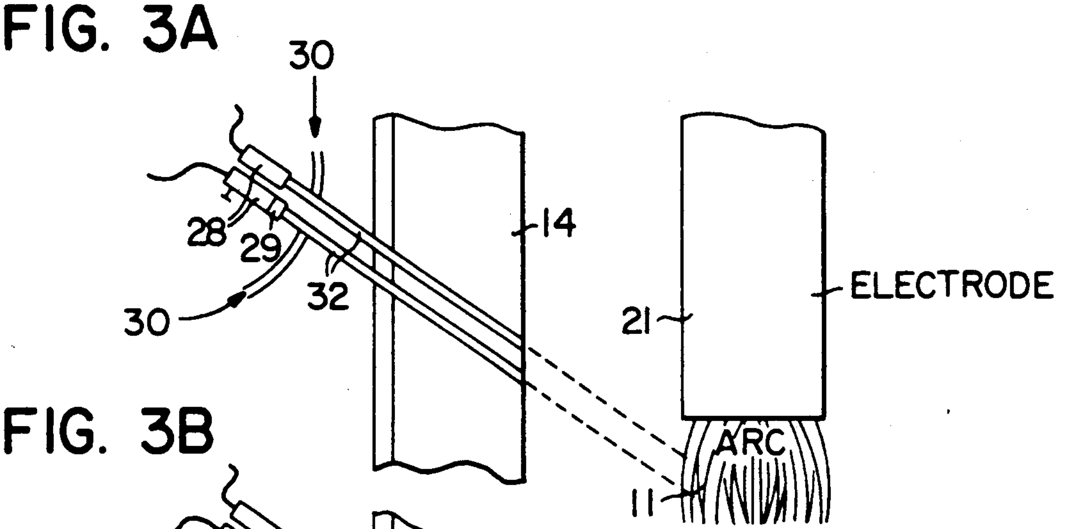
FIG. 3 is a diagrammatic view of the upper electrode in three different positions with respect to the position control means.
Figure 3B:
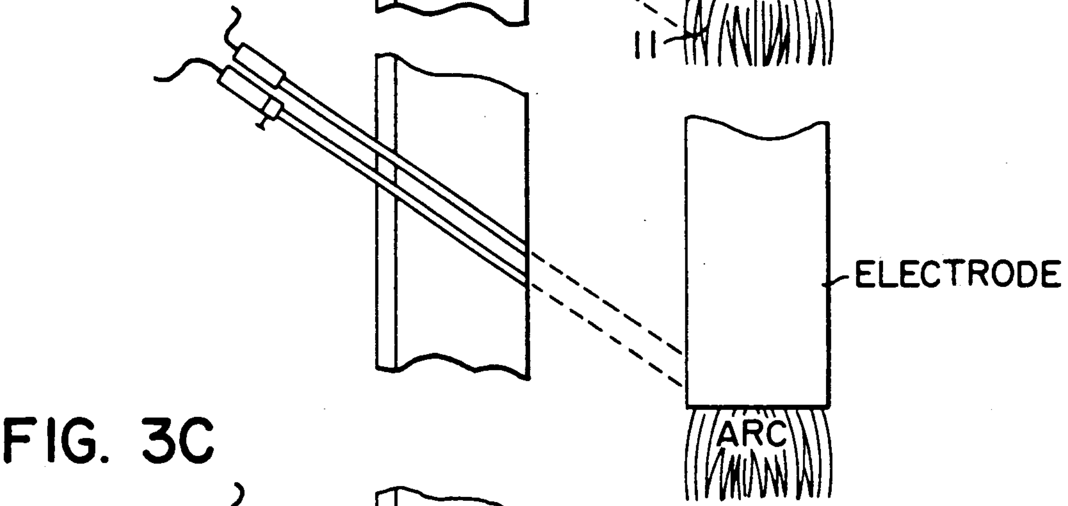
Figure 3C:
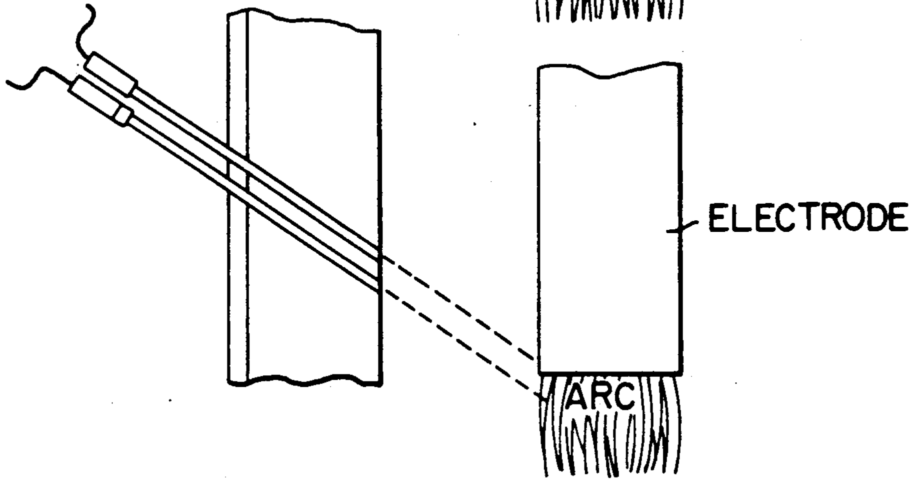

As shown in FIG. 3, the various situations encountered are shown in phases A, B and C. In A, both light pipes 32 are aimed at the luminous arc 11. Both voltage signals V1 and V2 are larger than their respective voltage references, and therefore the power supply is triggered to lower electrode 20. In B, both light pipes 32 are aimed at the luminous electrode 21. In this case both voltage signals V1 and V2 are smaller than their respective voltage references. Therefore the power supply is triggered to raise the electrode. In C, the upper light pipe 32 is aimed at the electrode end 21 while the lower light pipe 32 is aimed at the luminous arc 11. In this case the power supply is not triggered and the electrode 20 remains stationary.

The positioning means may also comprise means to weigh electrode 20 and means to measure its height outside reactor 10. Thus by knowing the density of a uniformly constructed electrode 20, the position of end 21 may be calculated and adjusted by drive system 26 as required.

Although the means for introducing material 12 are shown as feed tubes 24 through which material 12 is dropped, it is also possible to inject material 12 with gas feed 22 or separate from gas feed 22 but in a similar tangential direction.

Electrode 20 is shown as being of solid construction but may also be provided with a narrow central bore through which an arc stabilizing gas, preferably argon, may be injected.

What is claimed is:

1. An arc reactor used in treating a powder material that is conductive at very high temperatures, comprising:

a vertical electrically-insulated sleeve having an upper end, a lower end, and a cylindrically-shaped internal wall;

an upper electrode which is made of a consumable material and which is coaxially mounted at the upper end of the sleeve;

a bottom electrode cooperating with the upper electrode, both electrodes being connected to an electric power source, the electric power source producing an arc column between the upper and bottom electrodes;

means for injecting a first gas tangentially into the sleeve, the first gas creating a vortex inside the sleeve;

means for introducing the powder material inside the sleeve near the upper end beside the upper electrode, the means for introducing said powder material forming a substantially uniform cylindrical curtain of particles falling down into the sleeve, the particles being centrifugally projected against the internal wall of the sleeve by the vortex, the particles entirely covering and shielding the internal wall while simultaneously being radiated by the arc column, the particles being transformed into a molten form by the arc column;

a crucible which is positioned under the lower end of the sleeve and which collects the particles in molten form that drip down from the lower end of the sleeve, the particles in molten form being in conductive contact with the bottom electrode; and positioning means for adjusting a vertical position of the upper electrode by sliding the upper electrode through the upper end of the sleeve.

2. The improved reactor as claimed in claim 1, wherein the upper electrode has a lower end and the positioning means comprises a drive system for use in lowering and raising the upper electrode, and further comprising advancement control means, operatively connected to the drive system for automatically adjusting the position of the lower end of the upper electrode with respect to the particles in molten form collected in the crucible.

3. The reactor of claim 2, wherein said means for introducing the powder material includes a plurality of openings located around the electrode at said upper end, through which the powder material is fed into the sleeve, close to the internal wall thereof.

4. The reactor as claimed in claim 2, wherein the consumable electrode material is graphite.

5. The reactor as claimed in claim 2, wherein the upper electrode is tube-shaped having a narrow bore; and further comprising means for injecting a gas into the narrow bore and the arc column for stabilizing the arc column.

6. The reactor as claimed in claim 5, wherein said gas injected into the narrow base is gas which participates in the reaction occurring inside the reactor.

7. The reactor as claimed in claim 5, wherein the gas injected into the narrow base is argon.

8. An arc reactor used in treating a powder material that is conductive at very high temperatures, comprising:

a vertical electrically-insulated sleeve having an upper end, a lower end, and a cylindrically-shaped internal wall;

an upper electrode which is made of a consumable material and which is coaxially mounted at the upper end of the sleeve;

a bottom electrode cooperating with the upper electrode, both electrodes being connected to an electric power source, the electric power source producing an arc column between the upper and bottom electrodes;

means for injecting a first gas tangentially into the sleeve, the first gas creating a vortex inside the sleeve;

means for introducing the powder material inside the sleeve near the upper end beside the upper electrode, the means for introducing said powder material forming a substantially uniform cylindrical curtain of particles falling down into the sleeve, the particles being centrifugally projected against the internal wall of the sleeve by the vortex, the particles entirely covering and shielding the internal wall while simultaneously being radiated by the arc column, the particles being transformed into a molten form by the arc column;

a crucible which is positioned under the lower end of the sleeve and which collects the particles in molten form that drip down from the lower end of the sleeve, the particles in molten form being in conductive contact with the bottom electrode;

positioning means for adjusting a vertical position of the upper electrode by sliding the upper electrode through the upper end of the sleeve; and wherein the positioning means comprise advancement means and advancement control means, the advancement control means comprising a unit made of a radiation sensor, a light pipe in communication with the sensor and the internal wall, and a second gas supply in communication with the light pipe for cleaning said curtain of particles from the light pipe, the sensor controlling the advancement means for sensing the presence or absence of radiation emitted by the arc or the upper electrode from a direction aligned with the light pipe.

9. The reactor as claimed in claim 8, wherein said advancement control means comprise two said units, directed at different vertical points, such that one unit can sense radiation emitted by the arc and another unit can sense radiation emitted by the electrode.

10. An arc reactor used in treating a powder material that is conductive at very high temperatures, comprising:

a vertical electrically-insulated sleeve having an upper end, a lower end, and a cylindrically-shaped internal wall;

an upper electrode which is made of a consumable material coaxially and which mounted at the upper end of the sleeve;

a bottom electrode cooperating with the upper electrode, both electrodes being connected to an electric power source, the electric power source producing an arc column between the upper and bottom electrodes;

means for injecting a first gas tangentially into the sleeve, the first gas creating a vortex inside the sleeve;

means for introducing the powder material inside the sleeve near the upper end beside the upper electrode, the means for introducing said powder material forming a substantially uniform cylindrical curtain of particles falling down into the sleeve, the particles being centrifugally projected against the internal wall of the sleeve by the vortex, the particles entirely covering and shielding the internal wall while simultaneously being radiated by the arc column, the particles being transformed into a molten form by the arc column;

a crucible which is positioned under the lower end of the sleeve and which collects the particles in molten form that drip down from the lower end of the sleeve, the particles in molten form being in conductive contact with the bottom electrode;

positioning means for adjusting a vertical position of the upper electrode by sliding the upper electrode through the upper end of the sleeve; and wherein the positioning means comprises electrode weighing means for weighing a weight of the upper electrode, the upper electrode having a known density, and electrode length measuring means for measuring a length of the upper electrode outside the reactor, the vertical position of the upper electrode inside the sleeve being calculated from the length of the upper electrode outside the reactor, the weight of the upper electrode and the density of the upper electrode.

* * * * *